(12) United States Patent
Laslo et al.

(10) Patent No.: US 9,550,688 B2
(45) Date of Patent: Jan. 24, 2017

(54) METHOD AND APPARATUS FOR CATALYZING SEAWATER AERATION BASINS

(71) Applicant: ALSTOM Technology Ltd, Baden (CH)

(72) Inventors: Dennis James Laslo, Ten Mile, TN (US); Raymond R. Gansley, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 474 days.

(21) Appl. No.: 14/030,441

(22) Filed: Sep. 18, 2013

(65) Prior Publication Data
US 2015/0076081 A1 Mar. 19, 2015

(51) Int. Cl.

| | | |
|---|---|---|
| *B01D 53/14* | (2006.01) | |
| *B01D 53/50* | (2006.01) | |
| *B01D 53/73* | (2006.01) | |
| *B01D 53/75* | (2006.01) | |
| *C02F 1/66* | (2006.01) | |
| *C02F 1/72* | (2006.01) | |
| *C02F 1/74* | (2006.01) | |
| *C02F 101/10* | (2006.01) | |
| *C02F 103/08* | (2006.01) | |
| *C02F 103/18* | (2006.01) | |

(52) U.S. Cl.
CPC ........... *C02F 1/725* (2013.01); *B01D 53/1481* (2013.01); *C02F 1/727* (2013.01); *C02F 1/74* (2013.01); *B01D 53/504* (2013.01); *B01D 53/73* (2013.01); *B01D 53/75* (2013.01); *C02F 1/66* (2013.01); *C02F 2101/101* (2013.01); *C02F 2103/08* (2013.01); *C02F 2103/18* (2013.01); *F23J 2219/40* (2013.01); *F23J 2900/15041* (2013.01)

(58) Field of Classification Search
CPC ............... C02F 1/20; C02F 1/66; C02F 1/725; C02F 1/727; C02F 1/74; C02F 2101/101; C02F 2103/08; C02F 2103/18; B01D 53/504; B01D 53/73; B01D 53/1481; B01D 53/75; B01D 53/78; B01D 53/8609; B01D 53/869; B01D 53/8693; F23J 2900/15041; F23J 2219/40
See application file for complete search history.

(56) References Cited

U.S. PATENT DOCUMENTS

| 4,336,035 A | 6/1982 | Evenstad et al. |
|---|---|---|
| 4,502,872 A | 3/1985 | Ivester et al. |

(Continued)

FOREIGN PATENT DOCUMENTS

| EP | 2 347 816 A1 | 7/2011 |
|---|---|---|
| EP | 2 578 544 A1 | 4/2013 |

(Continued)

OTHER PUBLICATIONS

"Catalytic Seawater Flue Gas Desulfurization Model" F. Vidal Barrero et al; Environmental Science & Technology, vol. 43,No. 24, Dec. 15, 2009.

*Primary Examiner* — Lucas Stelling
(74) *Attorney, Agent, or Firm* — GE Global Patent Operation; Rita D. Vacca

(57) ABSTRACT

An apparatus and method for producing a catalyst rich seawater useful to catalyze oxidation reactions in a flue gas desulfurization system seawater aeration basin to obtain a treated seawater.

15 Claims, 2 Drawing Sheets

(56) References Cited

U.S. PATENT DOCUMENTS

| | | | |
|---|---|---|---|
| 5,484,535 A | 1/1996 | Downs | |
| 2005/0161410 A1 | 7/2005 | Wilson et al. | |
| 2011/0274605 A1* | 11/2011 | Peng ..................... | B01D 53/60 |
| | | | 423/235 |

FOREIGN PATENT DOCUMENTS

| | | | | |
|---|---|---|---|---|
| SE | WO 2012107817 A1 * | 8/2012 | ........... | B01D 53/507 |
| WO | 01/41902 A1 | 6/2001 | | |

* cited by examiner

METHOD AND APPARATUS FOR CATALYZING SEAWATER AERATION BASINS

FIELD OF THE INVENTION

The present invention relates to an apparatus operable to produce catalyst rich seawater useful to catalyze chemical reactions in a flue gas desulfurization system seawater aeration basin.

The present invention further relates to a method of using the subject apparatus to produce catalyst rich seawater useful to catalyze chemical reactions in a flue gas desulfurization system seawater aeration basin.

BACKGROUND OF THE INVENTION

In many industrial processes a process gas containing pollutants is generated. One such industrial process is the combustion of a fuel, such as coal, oil, peat, waste, and the like, in a combustion plant, such as a power plant, whereby a hot process gas is generated. This hot process gas is often referred to as a flue gas. The flue gas contains various pollutants including acid gases, such as sulphur dioxide, $SO_2$. It is necessary to remove as much of the acid gases as possible from the flue gas before the flue gas may be emitted to the ambient air. Another example of an industrial process in which a process gas containing pollutants is generated is the electrolytic production of aluminium from alumina. In that process, a process gas containing sulphur dioxide, $SO_2$, is generated within venting hoods of the electrolytic cells.

U.S. Pat. No. 5,484,535 discloses a seawater scrubber. In the seawater scrubber seawater taken from the ocean is mixed with a flue gas generated by a boiler. In the seawater scrubber, sulphur dioxide, $SO_2$, is absorbed in the seawater and forms sulphite and/or bisulphite ions. Effluent seawater from the seawater scrubber is forwarded to an aeration pond. Air is bubbled through the effluent seawater in the aeration pond for purposes of oxidizing, by means of oxygen gas contained in the air, sulphite and/or bisulphite ions to inert sulphate ions that may be released back to the ocean together with the effluent seawater.

Certain metals may be used to catalyze the above-described oxidation reactions occurring in effluent seawater aeration systems. As such, modern aeration systems used for oxidizing effluent seawater may dose the effluent seawater with metal by placing sheets or bars of such metals, such as iron sheets or iron bars, in the aeration system. Iron sheets or iron bars are placed in the aeration systems to catalyze the oxidation reactions in the effluent seawater since such metals are usually not present in the effluent seawater in sufficient quantity for this purpose.

SUMMARY OF THE INVENTION

An object of the present invention is to provide an apparatus and a method for producing catalyst rich seawater for use in a seawater aeration basin of a seawater based flue gas desulphurization system to catalyze oxidation reactions therein. As such, the catalysed oxidation reactions reduce sulphite levels in the effluent seawater treated in the seawater aeration basin. The so produced treated seawater may then be released back to the ocean. The subject apparatus and method disclosed herein is more efficient and/or cost effective than that of the noted prior art.

The above-noted object is achieved by means of an apparatus and a method for producing catalyst rich seawater useful in the treatment of effluent seawater following its absorption of sulfur dioxide from a flue gas containing sulfur dioxide. The subject apparatus and method uses dust and ash collected in a seawater based flue gas desulphurization system particulate collection device. The particulate collection device may be an electrostatic precipitator (ESP), a fabric filter (FF), or the like, as known to those skilled in the art. The collected dust and ash is diverted to a catalyst unit. The catalyst unit is used to leach catalysts from the collected dust and ash using an acidic liquid. Most preferably, the acidic liquid used in the catalyst unit is effluent seawater collected from a seawater based flue gas desulphurization system absorber. The catalyst unit comprises a tank preferably with an agitator, an inlet port for the collected ash, and an inlet port for the acidic liquid, e.g., effluent seawater. The catalyst unit is operable for providing requisite residence time and agitation of collected dust, ash and effluent seawater for iron, manganese and like catalyst leaching from the collected dust and ash into the effluent seawater to produce a catalyst rich seawater.

Following collected dust and ash leaching in the catalyst unit, the resultant catalyst rich seawater is separated from the remaining moist, leached dust and ash cake. As such, the separated catalyst rich seawater is supplied to the seawater based flue gas desulphurization system seawater aeration basin. The separated moist, leached dust and ash cake is discarded as waste or returned to and mixed with remaining dry collected dust and ash from the particulate collection device.

An advantage of the subject apparatus and method is that in the treatment of effluent seawater from the seawater based flue gas desulphurization absorber, the oxidation of bisulphite and/or sulphite ions is performed under catalyzed conditions using the catalyst rich seawater produced in the catalyst unit. Hence, the amount of oxygen required for the treatment of effluent seawater in the flue gas desulfurization system seawater aeration basin is significantly reduced. A reduction in the amount of oxygen required for the treatment of the effluent seawater in the seawater aeration basin reduces operational and capital costs associated with flue gas desulfurization overall.

In summary, the subject disclosure provides an apparatus comprising a catalyst unit operable to periodically contain an acidic liquid and particulates supplied from a particulate collection device for leaching of catalyst agents from the particulates to the acidic liquid to produce a catalyst rich liquid, and a seawater aeration basin fluidly connected to the catalyst unit operable to periodically contain the catalyst rich liquid from the catalyst unit and effluent seawater supplied from a seawater flue gas desulfurization system, to catalyze the oxidation of sulphite and/or bisulphite ions to inert sulphate ions within effluent seawater contained therein, thus producing a treated effluent seawater with a lower chemical oxygen demand (COD). Preferably the catalyst unit also includes an agitator operable to mix and agitate the combined acidic liquid and particulates to promote catalyst agent leaching from the particulates. For this purpose, the mixed acidic liquid and particulates contained in the catalyst unit are retained therein for a period of approximately 1 minute to approximately 20 minutes for leaching of catalyst agents from the particulates into the acidic liquid. The particulates supplied from the particulate collection device comprise dust and ash and the catalyzing agents leached therefrom comprise iron, manganese, and the like. The acidic liquid used in the catalyst unit most preferably comprises effluent seawater supplied from a seawater flue gas desulfurization system absorber.

Optionally the subject apparatus may include a neutralization basin operable to contain treated effluent seawater supplied from the seawater aeration basin. The neutralization basin is operable for containing treated effluent seawater during neutralization with a neutralization agent. The neutralization agent is supplied to the neutralization basin for contact with and neutralization of the treated effluent seawater. The neutralization agent used to neutralize the treated effluent seawater comprises limestone, fresh ocean seawater or a combination thereof.

The subject disclosure likewise provides a method comprising providing a catalyst unit operable to contain an acidic liquid and particulates supplied from a particulate collection device for leaching of catalyst agents from the particulates to the acidic liquid to produce a catalyst rich liquid, and providing a seawater aeration basin fluidly connected to the catalyst unit operable to contain the catalyst rich liquid from the catalyst unit and effluent seawater supplied from a seawater flue gas desulfurization system absorber, to catalyze oxidation reactions of sulphite and/or bisulphite ions to inert sulphate ions within effluent seawater contained therein to produce a treated effluent seawater with a lower COD. The method may further comprise providing an agitator in the catalyst unit operable to mix and agitate the acidic liquid and particulates to promote catalyst agent leaching from the particulates to the acidic liquid. According to the subject method, the mixed acidic liquid and particulates contained in the catalyst unit are retained for a period of approximately 1 minute to approximately 20 minutes for leaching of catalyst agents from the particulates to the acidic liquid. The particulates comprise dust and ash and the catalytic agents leached therefrom comprise iron, manganese, and the like. The acidic liquid most preferably comprises effluent seawater supplied from a seawater flue gas desulfurization system absorber.

The subject method may further comprise providing a neutralization basin containing treated effluent seawater supplied from the seawater aeration basin, for treated effluent seawater neutralization with a neutralization agent comprising limestone, fresh ocean seawater or a combination thereof, supplied to the neutralization basin for contact with and neutralization of the treated effluent seawater.

Further objects and features of the present disclosure will be apparent from the following description and claims.

BRIEF DESCRIPTION OF THE DRAWINGS

The invention will now be disclosed in more detail with reference to the appended drawings described below.

DETAILED DESCRIPTION

Figure 1:
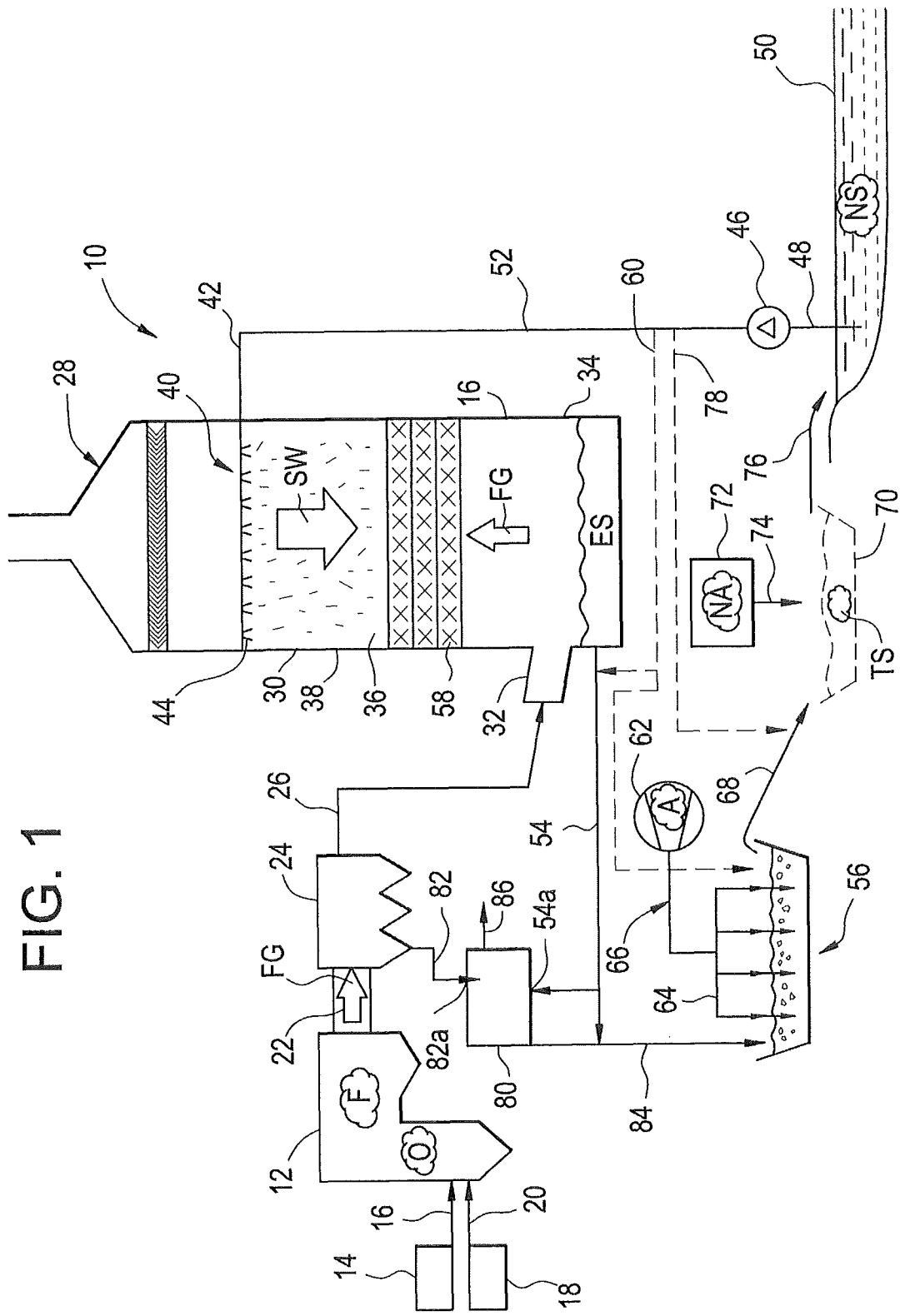
FIG. 1 is a schematic side cross-section view of a power plant with apparatus according to the present disclosure.

FIG. 1 is a schematic side cross-section view illustrating a power plant 10. The power plant 10 comprises a boiler 12 to which a fuel F, such as coal, oil, or the like, is supplied from a fuel source 14 through a fluidly connected feeding pipe 16 to boiler 12 for combustion therein. Fuel F is combusted in boiler 12 in the presence of oxygen O, supplied to boiler 12 via a fluidly connected oxygen supply duct 20 from an oxygen source 18. The oxygen O supplied to boiler 12 may, for example, be supplied in the form of air, and/or in the form of a mixture of oxygen gas and recirculated power plant 10 flue gas FG. In such a case, boiler 12 would be what is commonly called an "oxy-fuel" boiler. The combustion of the fuel F generates a hot process gas in the form of a flue gas FG. Sulphur species contained in fuel F, upon combustion of the fuel F, form sulphur dioxide, $SO_2$. As such, power plant 10 flue gas FG includes as a portion thereof sulphur dioxide.

Produced flue gas FG flows from the boiler 12, via a fluidly connected duct 22, to a particulate collection device 24, in the form of a fabric filter or electrostatic precipitator. The particulate collection device 24, such as an electrostatic precipitator as described in U.S. Pat. No. 4,502,872, serves to remove dust and/or ash particles entrained in the flue gas FG. Alternatively, a fabric filter such as that described in U.S. Pat. No. 4,336,035, may be used for particulate collection of flue gas dust and/or ash from the flue gas FG.

The flue gas FG from which most of the ash and/or dust particles have been removed, flows from the particulate collection device 24 via a fluidly connected duct 26 to a seawater based flue gas desulfurization system 28. The seawater based flue gas desulfurization system 28 comprises a wet scrubber tower or absorber 30. Absorber 30 may be a packed tower, a tray tower, a spray tower, or like tower design known to those skilled in the art. For purposes of clarity, absorber 30 is only described and illustrated herein as a packed tower, although other tower designs are possible within the scope of the present disclosure. As such, an inlet 32 is arranged at a lower portion 34 of the absorber 30. The duct 26 is fluidly connected to the inlet 32, such that flue gas FG flowing from particulate collection device 24 via duct 26 may enter interior 36 of absorber 30 via inlet 32.

After entering interior 36, flue gas FG flows vertically upward through absorber 30, as indicated by arrow F. Central portion 38 of absorber 30 is equipped with a spray arrangement 40. For purposes of clarity, only one spray arrangements 40 is illustrated in FIG. 1 although additional arrangements 40 could be added. Each spray arrangement 40 comprises a supply pipe 42 and nozzles or distribution orifices 44 fluidly connected to the respective supply pipe 42. Seawater SW supplied via the respective supply pipe 42 to orifices 44 is distributed onto packing 58 where the supplied seawater SW flows by gravity through packing 58. As such, contact occurs between the downwardly flowing seawater SW and the upwardly flowing flue gas FG for seawater SW absorption of sulphur dioxide, $SO_2$, from the flue gas FG within interior 36 of absorber 30.

A pump 46 is arranged for pumping seawater SW via fluidly connected suction pipe 48 from seawater supply or ocean 50, and forwarding the seawater SW via fluidly connected pressure pipe 52 to fluidly connected supply pipe 42.

In accordance with an alternative embodiment, the seawater SW supplied by pump 46 to supply pipe 42 may be seawater SW previously utilized as cooling water in steam turbine systems (not shown) associated with the boiler 12 prior to supply of such seawater SW to absorber 30.

The subject seawater based flue gas desulfurization system 28 may comprise one or more layers of packing 58 arranged in interior 36 of absorber 30. Packing 58 may be fabricated from plastic, steel, wood, or another suitable material that enhances gas-liquid contact. With packing 58, orifices 44 merely distribute seawater SW over the packing 58 rather than atomizing the seawater SW as common in other tower designs. Examples of packing 58 include Mellapak™ available from Sulzer Chemtech AG, Winterthur, CH, and Pall™ rings available from Raschig GmbH, Ludwigshafen, DE.

Seawater SW distributed by means of orifices 44 in interior 36 of absorber 30 flows downwardly in absorber 30 and absorbs sulphur dioxide from the flue gas FG flowing vertically upwardly through packing 58 in interior 36 of absorber 30. Absorption of sulphur dioxide by the seawater SW in interior 36 forms effluent seawater ES collected in lower portion 34 of absorber 30. Most preferably, a portion of approximately 10% or less of effluent seawater ES collected in lower portion 34 of absorber 30 is forwarded via a fluidly connected effluent pipe 54 though fluidly connected inlet 54a of catalyst unit 80. The remaining effluent seawater ES of approximately 90% or more is forwarded via effluent pipe 54 to pipe 84.

Catalyst unit 80 is operative to receive and periodically contain an acidic liquid, most preferably a portion of effluent seawater ES from absorber 30, and to receive and periodically contain collected dust and/or ash from particulate collection device 24. Hereinafter for purposes of simplicity and clarity, collected dust, ash and the like from particulate collection device 24 is referred to herein simply as "ash". Collected ash from particulate collection device 24 is transported via fluidly connected duct 82 through fluidly connected inlet 82a of catalyst unit 80. Within catalyst unit 80, effluent seawater ES is mixed for a resident time of approximately 1 minute to approximately 20 minutes, with the collected ash from particulate collection device 24. During this resident time, agitators (not shown) may be used to agitate and further mix the acidic liquid and collected ash combining the two to form a slurry. Through this resident time and agitation or turbulence, the acidic liquid leaches catalyst agents such as iron, manganese, and the like in varying amounts from the collected ash to produce a catalyst rich seawater CS. The produced catalyst rich seawater CS is separated in a dewatering step from the leached ash, by simple draining, centrifuge or the like. The separated catalyst rich seawater CS is forwarded from catalyst unit 80 through a fluidly connected pipe 84 to seawater aeration basin 56. The moist, leached ash cake remaining in catalyst unit 80 following separation from the catalyst rich seawater CS is transported from catalyst unit 80 via fluidly connected waste pipe 86 for discard or for mixing with remaining dry collected ash from particulate collection device 24 for uses elsewhere in the power plant 10, or otherwise. Alternative embodiments can be conceived for contacting the effluent seawater ES with the ash, such as for example tanks with continuous effluent seawater ES and ash flow therethrough and external catalyst rich seawater CS and ash separation devices.

Accordingly, catalyst rich seawater CS is obtained from power plant 10 process waste products, i.e., effluent seawater ES and collected ash. Use of the catalyst rich seawater CS in the seawater aeration basin 56 reduces oxygen A demand in seawater aeration basin 56 for the oxidation of sulphite and/or bisulphite ions to inert sulphate ions in effluent seawater ES treated therein prior to resultant treated seawater TS environmental release to the ocean 50. Reducing the oxygen A demand of the seawater aeration basin 56 significantly reduces associated operation costs. Likewise, by using catalyst rich seawater CS, the size of the seawater aeration basin 56 may be reduced significantly thus reducing capital and operational expenses associated therewith.

Optionally, if needed, fresh seawater SW may be added to the effluent seawater ES prior to treatment of the effluent seawater ES. To this end, a pipe 60 may be fluidly connected to pressure pipe 52 to forward a flow of fresh seawater SW to fluidly connected effluent pipe 54 forwarding effluent seawater ES to catalyst unit 70 and seawater aeration basin 56. Hence, an intermixing of fresh seawater SW and effluent seawater ES may occur in pipe 54. As another optional alternative, the fresh seawater SW forwarded via pipe 60 may be forwarded directly to seawater aeration basin 56 mixing with the effluent seawater ES therein. As a still further option, residual waters and/or condensates generated in the boiler 22 or steam turbine systems (not shown) associated therewith could be mixed with the effluent seawater ES in seawater aeration basin 56.

The absorption of sulphur dioxide in interior 36 of absorber 30 is assumed to occur according to the following reaction:

$$SO_2(g)+H_2O \Rightarrow HSO_3^-(aq)+H^+(aq) \qquad [\text{eq. 1.1a}]$$

The bisulphite ions, $HSO_3^-$, may, depending on the pH value of the effluent seawater ES, dissociate further to form sulphite ions, $SO_3^{2-}$, in accordance with the following equilibrium reaction:

$$HSO_3^-(aq) \Longleftrightarrow SO_3^{2-}(aq)+H^+(aq) \qquad [\text{eq. 1.1b}]$$

Hence, as an effect of the absorption of sulfur dioxide, the effluent seawater ES will have a lower pH value as an effect of the hydrogen ions, $H^+$, generated in the absorption of sulfur dioxide, than that of the fresh seawater SW from the ocean 50, and will contain bisulphite and/or sulphite ions, $HSO_3^-$ and $SO_3^{2-}$, respectively. Bisulphite and/or sulphite ions are oxygen demanding substances, and the release thereof to the ocean 50 is restricted.

In the seawater aeration basin 56, the bisulphite and/or sulphite ions, $HSO_3^-$ and/or $SO_3^{2-}$, are oxidized, if necessary, by reacting the same with oxygen A, in accordance with the following reactions:

$$HSO_3^-+H^++\tfrac{1}{2}O_2(g) \Rightarrow SO_4^{2-}+2H^+ \qquad [\text{eq. 1.2a}]$$

$$SO_3^{2-}+2H^++\tfrac{1}{2}O(g) \Rightarrow SO_4^{2-}+2H^+ \qquad [\text{eq. 1.2b}]$$

As such, the seawater aeration basin 56 may comprise a compressor or a blower 62 operative for blowing, via fluidly connected ductwork 64, an oxygen containing gas, such as air, into the effluent seawater ES therein. The blower 62 and the ductwork 64 together form an oxygen supply system 66 for supplying oxygen A to the effluent seawater ES in the seawater aeration basin 56. A more detailed description of the seawater aeration basin 56 is provided hereinafter with reference to FIG. 2.

Treated seawater TS flows out of seawater aeration basin 56 via fluidly connected overflow pipe 68 to an optional neutralization basin 70. Supply 72 of neutralization agent NA is arranged for supplying neutralization agent NA via fluidly connected pipe 74 to neutralization basin 70. The neutralization agent NA may for example be limestone, fresh seawater from the ocean, or a combination thereof, which serves to neutralize, as needed, the hydrogen ions, $H^+$, in the treated seawater TS as an effect of the oxidation of bisulphite and/or sulphite ions, $HSO_3^-$ and $SO_3^{2-}$, in accordance with equations 1.1a-b and 1.2a. As such, the neutralization could occur according to the following scheme;

$$H^++HCO_3^- \Rightarrow H_2O+CO_2(g) \qquad [\text{eq. 1.3}]$$

The resultant neutralized seawater NS flows via a fluidly connected overflow pipe 76 from the neutralization basin 70 to the ocean 50.

In accordance with an alternative embodiment, the treated seawater TS forwarded via overflow pipe 68 is forwarded directly to the ocean 50 without a need for neutralization in neutralization basin 70. In accordance with a further alternative embodiment, the treated seawater TS is mixed with fresh seawater SW prior to being discharged into the ocean

50. To this end, a pipe 78 may be fluidly connected to pressure pipe 52 to forward a flow of fresh seawater SW to fluidly connected overflow pipe 68. Hence, an intermixing of fresh seawater SW and treated seawater TS occurs in pipe 68.

Figure 2:
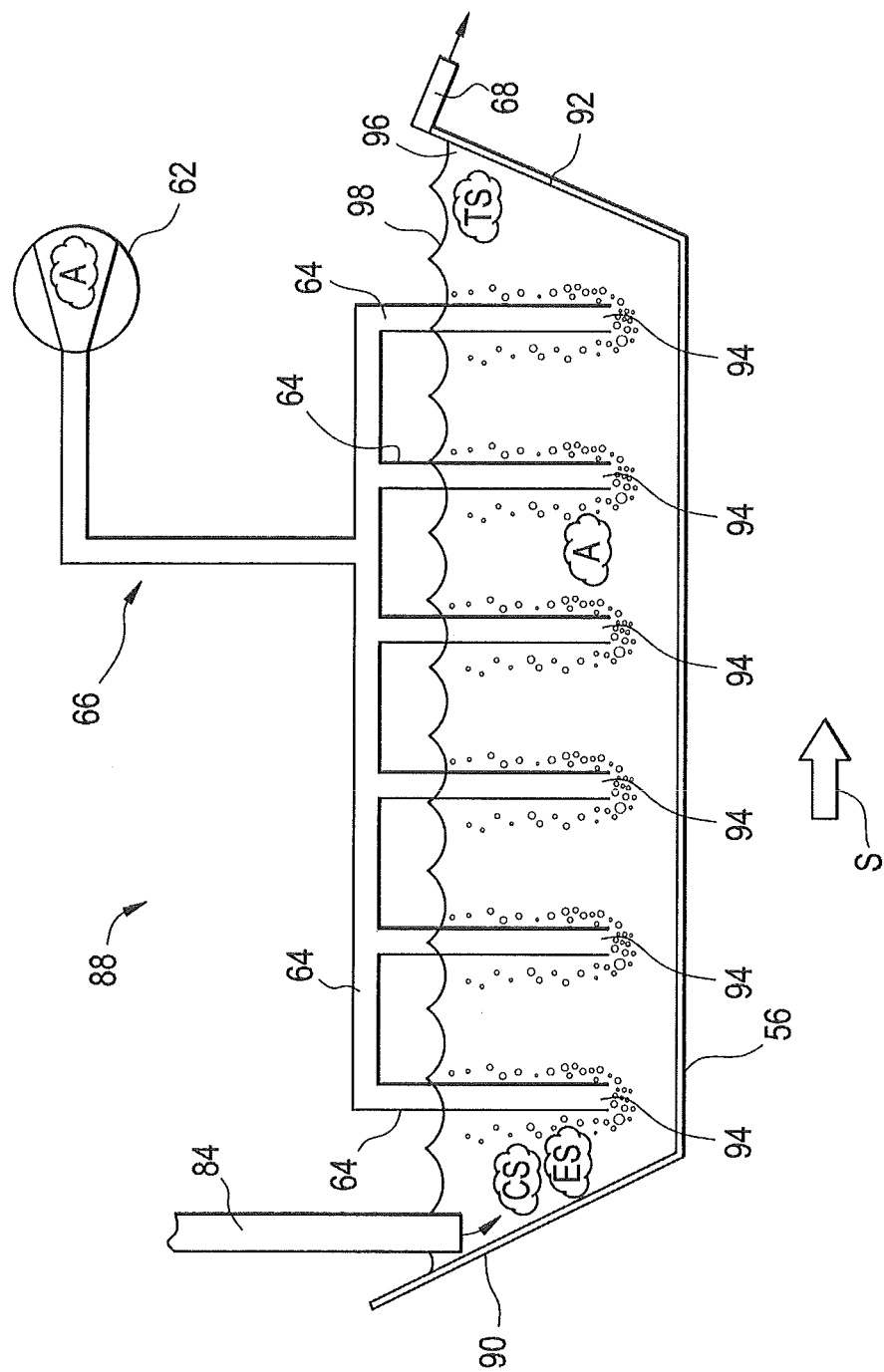
FIG. 2 is a schematic side cross-section view illustrating an enlarged seawater based flue gas desulfurization system seawater aeration basin according to FIG. 1.

FIG. 2 illustrates the seawater aeration basin 56 in more detail. Catalyst rich seawater CS is supplied to the seawater aeration basin 56 of aeration system 88 via fluidly connected pipe 84 at a first end 90, being an inlet end of seawater aeration basin 56. The catalyst rich seawater CS flows, generally horizontally as indicated by arrow S, from the first end 90 to a second end 92, being an outlet end of seawater aeration basin 56. As catalyst rich seawater CS flows from the first end 90 to a second end 92, the iron, manganese, and like catalyst agents therein speed the chemical reactions of the oxygen and sulfite ions resulting in a treated seawater TS. At the second end 92, treated seawater TS overflows from seawater aeration basin 56 via fluidly connected overflow pipe 68 into optional neutralization basin 70.

Aeration system 88 further includes the oxygen supply system 66 with ductwork 64. The ductwork 64 comprises a number of outlets 94 within interior 96 of seawater aeration basin 56. Blower 62 blows oxygen A through ductwork 64 for release from outlets 94 below liquid surface 98 of seawater aeration basin 56. The ductwork 64 extends along the seawater aeration basin 56, between the first end 90 and the second end 92 thereof. Oxygen A blown by blower 62 and released from outlets 94 mixes with the effluent seawater ES in seawater aeration basin 56. Oxygen A is dispersed in and mixed with effluent seawater ES to oxidize remaining bisulphite and/or sulphite ions present. As noted above, use of catalyst rich seawater CS in seawater aeration basin 56, significantly reduces the oxygen A demand of seawater aeration basin 56 for conversion of sulphites to inert sulfates prior to environmental release in ocean 50. By reducing the oxygen A demand of the seawater aeration basin 56 costs associated therewith are significantly reduced. Likewise, with the use of catalyst rich seawater CS, the size of the seawater aeration basin 56 may be reduced significantly thereby also reducing capital and operational expenses associated therewith.

In summary, the subject disclosure provides an apparatus comprising a catalyst unit operable to contain an acidic liquid and particulates supplied from a particulate collection device for leaching of catalyst agents from the particulates to the acidic liquid to produce a catalyst rich liquid, and a seawater aeration basin fluidly connected to the catalyst unit operable to contain the catalyst rich liquid from the catalyst unit and effluent seawater ES supplied from a seawater flue gas desulfurization system to catalyze the oxidation of sulphite and/or bisulphite ions to inert sulphate ions within effluent seawater ES contained therein, thus producing a treated seawater TS. Preferably the catalyst unit 80 also includes an agitator operable to mix and agitate the combined acidic liquid and particulates to promote catalyst agent leaching from the particulates. For this purpose, the mixed acidic liquid and particulates contained in the catalyst unit 80 are retained therein for a period of approximately 1 minute to approximately 20 minutes for leaching of catalyst agents from the particulates into the acidic liquid. The particulates supplied from the particulate collection device comprise dust, ash and the like, and the catalyzing agents leached therefrom comprise iron, manganese, and the like. The acidic liquid used in the catalyst unit most preferably comprises effluent seawater ES supplied from a seawater flue gas desulfurization system absorber.

Optionally, the subject apparatus may include a neutralization basin operable to contain treated seawater TS supplied from the seawater aeration basin. The neutralization basin is operable for containing treated seawater TS during neutralization with a neutralization agent to produce a neutralized seawater NS. As such, neutralization agent NA is supplied to the neutralization basin for contact with and neutralization of the treated seawater TS. The neutralization agent used to neutralize the treated seawater TS comprises limestone, fresh ocean seawater or a combination thereof.

The subject disclosure likewise provides a method comprising providing a catalyst unit operable to contain an acidic liquid and particulates supplied from a particulate collection device for leaching of catalyst agents from the particulates to the acidic liquid to produce a catalyst rich liquid, and providing a seawater aeration basin fluidly connected to the catalyst unit operable to contain the catalyst rich liquid from the catalyst unit and effluent seawater ES supplied from a seawater flue gas desulfurization system absorber to catalyze oxidation reactions of sulphite and/or bisulphite ions to inert sulphate ions within effluent seawater ES contained therein to produce a treated seawater TS. The method may further comprise providing an agitator in the catalyst unit operable to mix and agitate the acidic liquid and particulates to promote catalyst agent leaching from the particulates to the acidic liquid. According to the subject method, the mixed acidic liquid and particulates contained in the catalyst unit are retained for a period of approximately 1 minute to approximately 20 minutes for leaching of catalyst agents from the particulates to the acidic liquid. The particulates comprise dust, ash, and the like, and the catalytic agents leached therefrom comprise iron, manganese, and the like. The acidic liquid most preferably comprises effluent seawater ES supplied from a seawater flue gas desulfurization system absorber.

The subject method may further comprise providing a neutralization basin containing treated seawater TS supplied from the seawater aeration basin, for treated seawater TS neutralization with a neutralization agent NA comprising limestone, fresh ocean seawater or a combination thereof, supplied to the neutralization basin for contact with and neutralization of the treated seawater TS.

While the present invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will be appreciated that numerous modifications of the embodiments described above are possible within the scope of the appended claims.

The invention claimed is:

1. An apparatus comprising:
    a particulate collection device operative to remove particulates from flue gas, the removed particulates supplied via a first duct to a catalyst unit;
    a seawater flue gas desulfurization system producing an acidic liquid with a portion of the acidic liquid supplied via a second duct to the catalyst unit, the second duct separate from the first duct;

the catalyst unit operable to periodically contain the acidic liquid and particulates supplied from the particulate collection device for leaching of catalyst agents from the particulates into the acidic liquid to produce a catalyst rich liquid; and a seawater aeration basin fluidly connected to the catalyst unit operable to contain the catalyst rich liquid from the catalyst unit and effluent seawater supplied from the seawater flue gas desulfurization system, to catalyze oxidation of sulphite ions to inert sulfate ions within effluent seawater contained therein to produce a treated seawater.

2. The apparatus according to claim 1 further comprising an agitator in the catalyst unit operable to mix and agitate the acidic liquid and particulates to promote catalyst agent leaching from the particulates.

3. The apparatus according to claim 1, wherein the mixed acidic liquid and particulates contained in the catalyst unit are retained for a period of approximately 1 minute to approximately 20 minutes for leaching of catalyst agents from the particulates.

4. The apparatus according to claim 1, wherein the particulates comprise dust and ash.

5. The apparatus according to claim 1, wherein the catalyzing agents comprise iron, manganese or a combination thereof.

6. The apparatus according to claim 1, wherein the portion of acidic liquid supplied from the seawater flue gas desulfurization system to the catalyst unit is approximately 10% or less.

7. The apparatus according to claim 1, further comprising a neutralization basin containing treated seawater supplied from the seawater aeration basin, for treated seawater neutralization with a neutralization agent supplied to the neutralization basin for contact with the treated seawater therein to obtain neutralized seawater.

8. The apparatus according to claim 1, wherein a neutralization agent comprising limestone, fresh ocean seawater or a combination thereof is used to neutralize the treated seawater.

9. A method comprising:
providing a particulate collection device operative to remove particulates from flue gas, the removed particulates supplied via a first duct to a catalyst unit;

providing a seawater flue gas desulfurization system producing an acidic liquid with a portion of the acidic liquid supplied via a second duct to the catalyst unit, the second duct separate from the first duct;

providing the catalyst unit operable to periodically contain the acidic liquid and particulates supplied from the particulate collection device for leaching of catalyst agents from the particulates to the acidic liquid to produce a catalyst rich liquid; and providing a seawater aeration basin fluidly connected to the catalyst unit operable to contain the catalyst rich liquid from the catalyst unit and effluent seawater supplied from the seawater flue gas desulfurization system, to catalyze reactions of suphite ions to inert sulfate ions within effluent seawater contained therein to produce a treated water.

10. The method according to claim 9 further comprising providing an agitator in the catalyst unit operable to mix and agitate the acidic liquid and particulates to promote catalyst agent leaching from the particulates.

11. The method according to claim 9, wherein the mixed acidic liquid and particulates contained in the catalyst unit are retained for a period of approximately 1 minute to approximately 20 minutes for leaching of catalyst agents from the particulates.

12. The method according to claim 9, wherein the particulates comprise dust and ash.

13. The method according to claim 9, wherein the catalyzing agents comprise iron, manganese or a combination thereof.

14. The method according to claim 9, wherein the portion of acidic liquid supplied from the seawater flue gas desulfurization system to the catalyst unit is approximately 10% or less.

15. The method according to claim 9, further comprising providing a neutralization basin containing treated seawater supplied from the seawater aeration basin, for treated seawater neutralization with a neutralization agent comprising limestone, fresh ocean seawater or a combination thereof, supplied to the neutralization basin for contact with the treated seawater therein to obtain a neutralized seawater.

* * * * *

UNITED STATES PATENT AND TRADEMARK OFFICE
CERTIFICATE OF CORRECTION

PATENT NO. : 9,550,688 B2  
APPLICATION NO. : 14/030441  
DATED : January 24, 2017  
INVENTOR(S) : Laslo et al.

Page 1 of 1

It is certified that error appears in the above-identified patent and that said Letters Patent is hereby corrected as shown below:

In the Specification

In Column 1, Line 18, delete "processes" and insert -- processes, --, therefor.

In Column 2, Line 3, delete "uses" and insert -- use --, therefor.

In Column 3, Line 1, delete "Optionally" and insert -- Optionally, --, therefor.

In Column 5, Line 10, delete "though" and insert -- through --, therefor.

In Column 5, Line 67, delete "catalyst unit 70" and insert -- catalyst unit 80 --, therefor.

In Column 6, Line 7, delete "boiler 22" and insert -- boiler 12 --, therefor.

In Column 6, Line 35, delete "$SO_3^{2-}+2H^++{}^{1/2}O(g)=>SO_4^{2-}+2H^+$" and insert -- $SO_3^{2-}+2H^++{}^{1/2}O_2(g)=>SO_4^{2-}+2H^+$ --, therefor.

In Column 6, Line 50, delete "may for example" and insert -- may, for example, --, therefor.

In Column 6, Line 56, delete "scheme;" and insert -- scheme: --, therefor.

In the Claims

In Column 10, Line 15, in Claim 9, delete "suphite" and insert -- sulphite --, therefor.

In Column 10, Line 17, in Claim 9, delete "water." and insert -- seawater. --, therefor.

Signed and Sealed this  
Fourth Day of April, 2017

Michelle K. Lee  
*Director of the United States Patent and Trademark Office*